Oct. 31, 1967 D. A. OLSSON ET AL 3,349,608
ULTRASONIC THICKNESS COMPARATOR DEVICE
Filed Nov. 3, 1964 2 Sheets-Sheet 1

INVENTORS
Dexter A. Olsson
Carl W. Eriksson

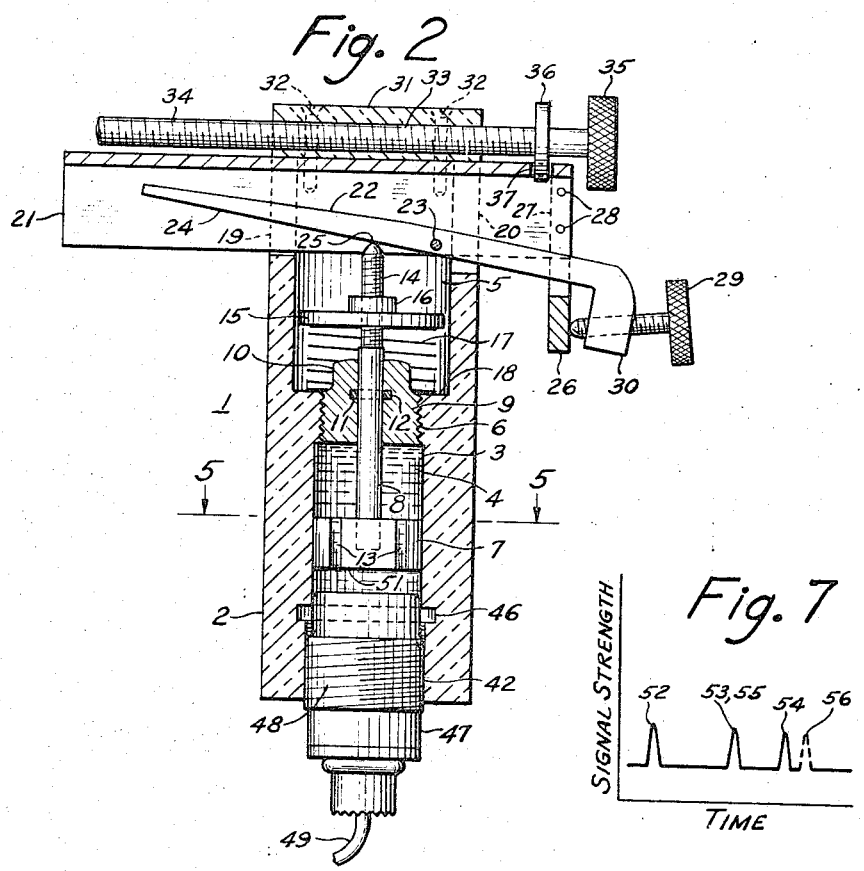
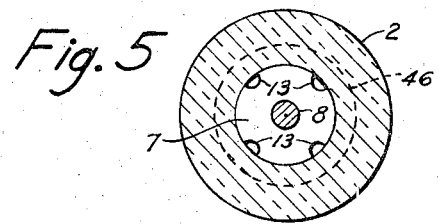
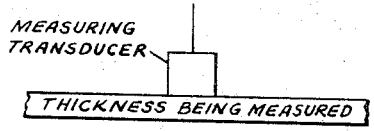

United States Patent Office 3,349,608
Patented Oct. 31, 1967

3,349,608
ULTRASONIC THICKNESS COMPARATOR
DEVICE
Dexter A. Olsson, Quakertown, Pa., and Carl W. Eriksson, Weymouth, Mass., assignors, by mesne assignments, to Bethlehem Steel Corporation, a corporation of Delaware
Filed Nov. 3, 1964, Ser. No. 408,563
15 Claims. (Cl. 73—67.8)

ABSTRACT OF THE DISCLOSURE

The distance between a reflector and transducer in a water-filled chamber is adjusted by a reciprocable ramp slidably engaging a rod secured to the reflector. The ramp is adjusted to synchronize signals from the transducer with signals from an ultrasonic pulse echo thickness measuring system, and the ramp has a scale thereon to give direct reading of thickness. Ramp slope is adjustable for different materials whose thickness is to be measured. In a modification, when the measuring transducer is watercolumn coupled to the test material, a secondary reflector in the chamber provides a path of fixed length equal to the effective height of the water column.

---

This invention relates generally to the measurement of distance by means of vibrational waves and, specifically, to a comparator device associated with pulse-echo thickness measuring apparatus employing vibrational pulses of ultrasonic frequency.

Prior art apparatus employing comparators to measure the thickness of an object by means of ultrasonic pulse-echo techniques required complex and time-consuming calibration procedures to accommodate different materials and thereby compensate for the different speeds of ultrasonic vibrations in said materials.

One of the objects of this invention is to provide improved means for measuring the thickness of an object.

Another object of this invention is to provide an efficient, direct-reading comparator device for use with ultrasonic pulse-echo thickness measuring systems.

Yet another object of this invention is to provide an efficient comparator device for use with ultrasonic pulse-echo thickness measuring systems employing either a contact coupling or water-column coupling between the test transduced and the object being measured.

Still a further object of this invention is to provide an efficient direct-reading comparator device for use with ultrasonic pulse-echo thickness measuring systems which comparator device is quickly calibrated for different materials.

Other and further objects of this invention will become apparent during the course of the following description and by reference to the appended claims.

We have discovered that the foregoing objects can be attained by providing a comparator device which can be used efficiently with ultrasonic pulse-echo thickness measuring apparatus employing either the contact or water-column method of coupling, which is quickly calibrated for use with different materials, and which gives a direct reading of the thickness of the object under test.

Referring now to the drawings in which like numerals represent like parts in the several views:

FIGURE 1 represents a view in elevation, partially broken away, of the comparator device of the present invention, for use with ultrasonic pulse-echo thickness measuring apparatus employing the water-column method of coupling between the test or measuring transducer and the object under test, with the water-column adapter in position.

FIGURE 2 represents a section in elevation, taken along the line 2—2 of FIGURE 3, showing the comparator device of the present invention, for use with ultrasonic pulse-echo thickness measuring apparatus employing the contact method of coupling between the test or measuring transducer and the object under test, and is generally similar to the apparatus of FIGURE 1 except that the water-column adapter has been removed and the calibration ramp has been adjusted for a different material.

FIGURE 5 represents a section in plan taken along the line 5—5 of FIGURE 2.

FIGURE 7 represents diagrammatically the screen of the cathode ray tube associated with ultrasonic pulse-echo thickness measuring systems employing water-column coupling and the comparator device of the present invention, showing in dashed lines a pulse from the comparator device before adjustment thereof, and omitting for purposes of clarity rereflected pulses of higher orders.

FIGURE 8 represents a portion of the block diagram of FIGURE 6, showing the test or measuring transducer contact coupled to the object under test.

FIGURE 9 represents diagrammatically the screen of the cathode ray tube associated with ultrasonic pulse-echo thickness measuring systems employing contact coupling and the comparator device of the present invention, showing in dashed lines a pulse from the comparator device before adjustment thereof, and omitting for purposes of clarity rereflected pulses of higher orders.

Figure 1:
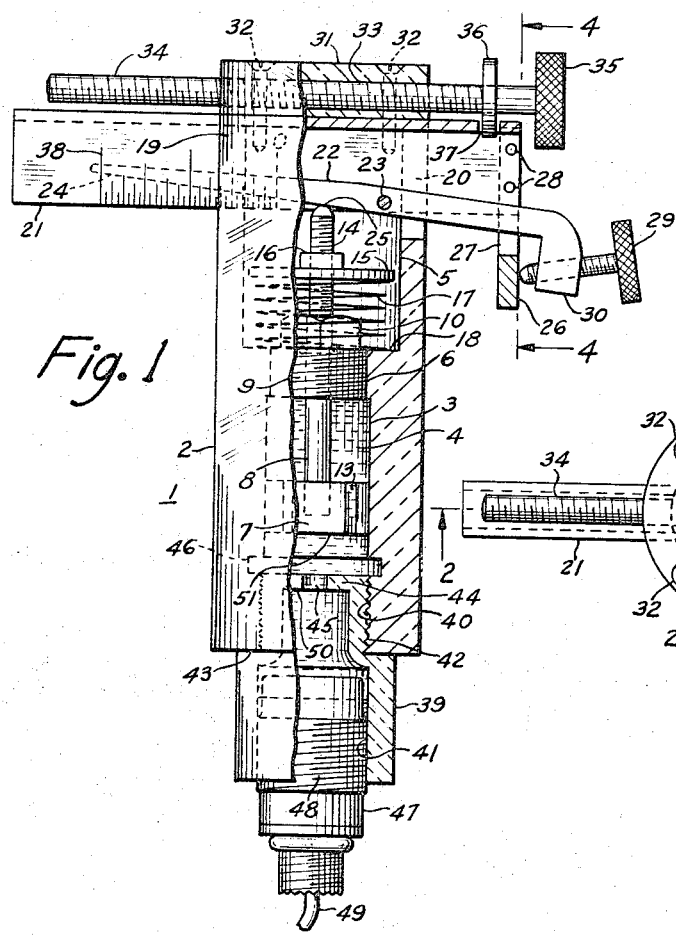
Figure 4:
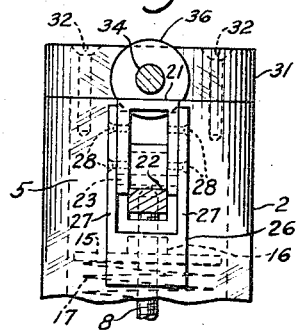
FIGURE 4 represents a section in elevation taken along the line 4—4 of FIGURE 1.
Figure 3:
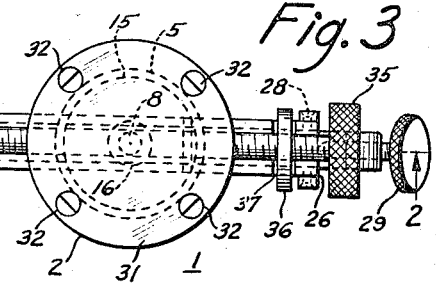
FIGURE 3 represents a view in plan of the comparator device.

Referring more particularly to FIG. 1, comparator device 1 comprises cylinder 2 formed with lower chamber 3 adapted to contain a body of water 4 or other liquid therein, and with upper chamber 5. Threaded passage 6 is provided in cylinder 2 between lower chamber 3 and upper chamber 5. Piston 7, made of material capable of reflecting ultrasonic pulses, is reciprocably mounted in lower chamber 3 and is provided with piston rod 8 extending upwardly therefrom and through sleeve 9 screwed into threaded passage 6 and into upper chamber 5. It is intended that sleeve 9 be tightly seated in threaded passage 6 to prevent the leakage of water 4 therethrough and, for this purpose, a square head 10 is provided on sleeve 9 by means of which the said sleeve 9 may be firmly threaded home. Also, where piston rod 8 extends through sleeve 9, a suitable water-tight seal is provided, such as rubber washer 11 seated in slot 12 in said sleeve 9 and engaging piston rod 8, as shown in the device of FIG. 2. When lower chamber 3 is closed, by means which will be described hereinafter, water in lower chamber 3 will pass from one side of piston 7 to the other as the said piston 7 is reciprocated in lower chamber 3 and grooves 13 on the perimeter of piston 7 are therefore provided for the passage of water 4.

It will be noted that the upper end of piston rod 8 is threaded as at 14. Spring retainer 15 is provided with threaded collar 16 and is adapted to be screwed down on piston rod 8. Spring 17 is interposed between spring retainer 15 and shelf 18 of cylinder 2, surrounding piston rod 8, and is under compression, thereby exerting an upward bias on piston rod 8 and on piston 7.

Slots 19 and 20 are provided at the upper end of cylinder 2, diametrically situated with respect to each other, and extend into upper chamber 5. Calibration ramp housing 21, having a cross section resembling an inverted U, is reciprocably mounted to said cylinder 2 through slots 19 and 20. Calibration ramp 22 is pivotally mounted to said calibration ramp housing 21 by means of pin 23, and the bottom surface 24 of calibration ramp 22 is adapted to engage the top 25 of piston rod 8.

Calibration control guide 26, having upstanding arms 27, is mounted to one end of calibration ramp housing 21 by means of screws 28. Calibration screw 29 is screwed through downturned portion 30 at one end of calibration ramp 22 and is biased to bear against calibration control guide 26 by the upward thrust of the top 25 of piston rod 8. It is apparent that, by threading calibration screw 29 in or out of downturned portion 30, the slope of calibration ramp 22 may be varied.

The top of cylinder 2 is provided with cylinder cap 31 held thereto by means of screws 32. Threaded passage 33 extends through cylinder cap 31 above and parallel to calibration ramp housing 21. Threaded measurement shaft 34 extends into threaded passage 33 and may be advanced or retracted therein by means of knob 35. A portion of collar 36 on threaded measurement shaft 34 is positioned in slot 37 in the upper edge of calibration ramp housing 21 by means of which the said calibration ramp housing 21 may be reciprocated as knob 35 is turned. It is apparent that, as knob 35 is turned in one direction or the other, calibration ramp 22 is reciprocated through upper chamber 5 and the position of piston 7 in lower chamber 3 will vary; further, the greater the slope of calibration ramp 22, the more will the position of piston 7 in lower chamber 3 vary with the same advancement or retraction of threaded measurement shaft 34. The purpose of adjusting the slope of calibration ramp 22 is to calibrate the comparator device 1 for use with different materials (i.e., materials in which the velocity of ultrasonic pulses differs). It will be noted that calibration ramp housing 21 is provided with scale markings 38 indexed by means of the outside edge of slot 19. These scale markings 38 have been calibrated to coordinate with calibration ramp 22 to give an accurate reading of object thickness.

Water-column adapter 39, provided with male threaded portion 40 and female threaded opening 41 is screwed into threaded opening 42 at the bottom of cylinder 2, shelf 43 of water-column adapter 39 bearing against the bottom of cylinder 2 for a water-tight seal as shown in FIGURE 1. With water-column adapter 39 in place, comparator device 1 may be used with ultrasonic pulse-echo thickness measuring systems employing water-column coupling between the test or measuring transducer and the object under test. Diaphragm 44, made of material capable of reflecting ultrasonic pulses and provided with central orifice 45, is mounted at the top of water-column adapter 39. The purpose of slot 46 between lower chamber 3 and threaded opening 42 is to insure that water-column adapter 39 can be fully threaded home without the upper end of male threaded portion 40 thereof meeting any obstruction, whereby the position of diaphragm 44 relative to other portions of comparator device 1 may be precisely maintained and reproduced when the said water-column adapter 39 is removed and replaced.

Transducer 47 provided with threaded portion 48 is screwed fully home in water-column adapter 39, thus tightly closing the lower end of lower chamber 3. When an electrical pulse, of extremely short duration as is known to those familiar with this art, is fed to transducer 47 by means of electrical conduit 49, the transducer 47 converts the said electrical pulse into a mechanical ultrasonic pulse which travels through the body of water 4. Part of the mechanical ultrasonic pulse is reflected by the bottom or near side 50 of diaphragm 44, which bottom or near side 50 may be termed the secondary reflector or target. Part of the mechanical ultrasonic pulse passes through orifice 45 and is reflected by the bottom or near side 51 of piston 7 back through orifice 45, the said bottom or near side of piston 7 being termed the primary reflector or target. When these reflected mechanical ultrasonic pulses reach transducer 47, they are reconverted to electrical pulses and are fed through electrical conduit 49 to the ultrasonic pulse-echo thickness measuring system. Actually, with water-column adapter 39 in place, three pulses will be transmitted back to the system through electrical conduit 49, the first pulse corresponding to the pulse fed by the transducer 47 to the body of water 4, it being understood that transducer 47, while sending pulses for very short periods of time, is always "listening." No mention need be made of rereflections of higher order.

When comparator device 1 is to be used with ultrasonic pulse-echo thickness measuring systems employing contact coupling between the test or measuring transducer and the object under test, water-column adapter 39 is removed from cylinder 2. Threaded portion 48 of transducer 47 having the same thread as male threaded portion 40 of water-column adapter 39, transducer 47 is screwed directly into threaded opening 42, as shown in FIGURE 2, for this application. In this form, only two pulses will be transmitted back to the system through electrical conduit 49, viz. a first pulse corresponding to the initially transmitted transducer pulse and a second pulse corresponding to the pulse reflected from the piston 7, without considering rereflections of higher orders.

Figure 6:
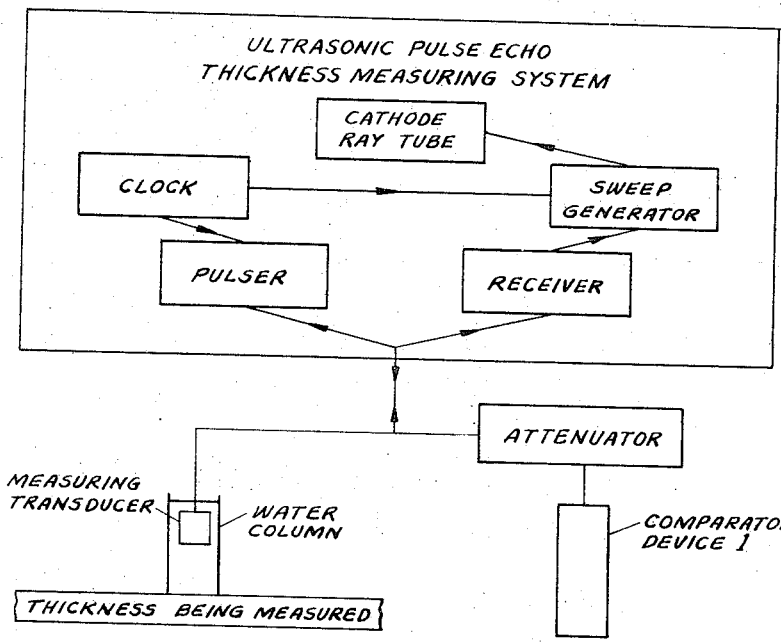
FIGURE 6 represents a block diagram of an ultrasonic pulse-echo thickness measuring system employing water-column coupling between the test or measuring transducer and the object under test.

The block diagram of an ultrasonic pulse-echo thickness measuring system with which the present comparator device 1 may be used is shown in FIGURE 6 the test or measuring transducer being water-column coupled to the object being tested, water-column adapter 39 being in place in comparator device 1 as shown in FIGURE 1. As shown, the "Clock" times the "Pulser" and the "Sweep Generator" for the "Cathode Ray Tube." The "Pulser" generates an electrical pulse which is fed simultaneously to the "Measuring Transducer" and to transducer 47 of comparator device 1 through an "Attenuator." The "Measuring Transducer" and transducer 47 will simultaneously generate an ultrasonic mechanical or vibrational pulse and, as the "Measuring Transducer" and transducer 47 are always "listening" for reflections and echoes, the said "Measuring Transducer" and transducer 47 will reconvert part of said pulses to an electrical pulse which is fed back to the "Receiver" and to the "Sweep Generator" to appear on the screen of the "Cathode Ray Tube" as one peak, indicated by the numeral 52 in FIGURE 7. The ultrasonic mechanical pulse generated by the "Measuring Transducer" will travel through the body of water in the column and will reach the interface between the body of water and the object under test. Part of the mechanical pulse will be reflected from the interface back to the "Measuring Transducer," will be reconverted to an electrical pulse, fed back to the "Receiver" and "Sweep Generator" and will appear on the screen of the "Cathode Ray Tube" as another peak, indicated by the numeral 53 in FIGURE 7. Part of the mechanical pulse will pass through the interface between the body of water and the object under test, and will pass through the said object and will be reflected from the rear thereof (actually, the interface between said object and the air). This reflected pulse, when received by the "Measuring Transducer," will be reconverted to an electrical pulse, fed back to the "Receiver" and "Sweep Generator" and will appear on the screen of the "Cathode Ray Tube" as yet another peak, indicated by the numeral 54 in FIGURE 7. It is apparent that, the thicker the object under test, the greater will be the time interval between peaks 53 and 54, or, to put it another way, the greater will be the distance between peaks 53 and 54 on the screen of the "Cathode Ray Tube." Turning now to comparator device 1, part of the mechanical pulse generated by transducer 47 will strike secondary target 50 (the bottom or near side of diaphragm 44) and will be reflected back to transducer 47, be reconverted to an electrical pulse, fed back through the "Attenuator," "Receiver" and "Sweep Generator"

and appear on the screen of the "Cathode Ray Tube" as peak 55 as shown in FIGURE 7. The distance between the "Measuring Transducer" and the interface between the body of water and the object under test is the same as the distance between transducer 47 and secondary target 50. Consequently, peaks 53 and 55 will coincide. Part of the mechanical pulse generated by transducer 47 will pass through orifice 45, striking primary target 51 (the bottom or near side of piston 7), and will be reflected back through orifice 45 to transducer 47 which will reconvert the reflected mechanical pulse to an electrical pulse, the latter being fed back through the "Attenuator," "Receiver" and "Sweep Generator," and will appear on the screen of "Cathode Ray Tube" as peak 56 which, until comparator device 1 is adjusted, will lie to one side or the other of peak 54 as shown in dashed lines in FIGURE 7. The ratio of the velocities of ultrasonic pulses through the object under test and the water (or other liquid) 4 in comparator device 1 is a constant, and the slope of calibration ramp 22 must be adjusted by means of calibration screw 29 to correspond with this ratio for the material from which the said object is made. The higher the ratio of pulse velocity in the object to pulse velocity in water (i.e., the faster the pulse travels in the object) the less will be the slope of calibration ramp 22, and the less will be the excursion of piston 7 changing the length of the path of the pulse through comparator device 1 for the same angular displacement of knob 35. Assuming that calibration ramp 22 has been adjusted in slope to correspond with the material constituting the object under test, knob 35 is rotated and peak 56 will be shifted to coincide with peak 54 on the screen of "Cathode Ray Tube." Scale 38 on calibration ramp housing, which has been calibrated and coordinated with calibration ramp 22 and which is indexed on the outside edge of slot 19, gives a direct reading of the thickness of the object under test.

The block diagram of an ultrasonic pulse-echo thickness measuring system employing contact coupling between the test or measuring transducer and the object under test is the same as shown in FIGURE 6, except that "Measuring Transducer" is in direct contact with the object as shown in FIGURE 8. Comparator device 1 has water-column adapter 39 removed therefrom as shown in FIGURE 2. The operation is the same as for the water-column coupled system, except that peaks 53 and 55 will not occur. The greater the thickness of the object under test the greater will be the time interval, and distance on the screen of the "Cathode Ray Tube," between peaks 52 and 54. FIGURE 9 shows diagrammatically the screen of the "Cathode Ray Tube" in respect to contact coupled "Measuring Transducer" and the object.

The "Attenuator" permits equalization of the signal strengths returning from the "Measuring Transducer" and transducer 47, by adjustment of the signal strength from transducer 47 and, while the "Attenuator" improves the accuracy of thickness measurement, it is not essential to the system.

"Measuring Transducer" and transducer 47 are preferably of the same material and, conventionally may be made of quartz, barium titanate, lead zirconate, etc. It sometimes happens that the frequency of the "Measuring Transducer" is limited by the nature of the material under test. In any event, the frequency of transducer 47 should be high to provide sharp, accurate peaks on the screen of the "Cathode Ray Tube."

Piston 7 and diaphragm 44, offering primary and secondary targets or reflectors respectively, are preferably made of a stainless steel, as the reflecting qualities of stainless steels in water are excellent, and corrosion problems are eliminated.

Cylinder 2 should be made of a transparent material, to permit inspection of the internal components to insure that they are in good working order and to observe if air has infiltrated and become trapped in lower chamber 3.

The size of orifice 45 may depend upon the size and frequency of transducer 47 and upon the height of the water column between transducer 47 and secondary target 50. An orifice diameter of $5/16''$ has been found satisfactory for a $3/4''$ diameter transducer operating at 5 megacycles with a water column $1''$ high between transducer 47 and secondary target 50. While shown for use with thickness-measuring systems, the comparator device 1 is intended broadly for use with distance-measuring systems.

While we have shown the best embodiment of our invention now known to us, we do not wish to be limited to the exact structure shown and described herein but may use such substitutions, modifications or equivalents as are embraced within the scope of this specification or as pointed out in the appended claims.

We claim:
1. A comparator for use with ultrasonic pulse-echo distance measuring apparatus, said comparator comprising:
   (a) chamber means having first and second opposed ends,
   (b) transducer means extending into the first end of said chamber means,
   (c) rod means having first and second ends, said rod means slidably extending for reciprocating movement through the second end of said chamber means,
   (d) reflector means in said chamber means opposed to said transducer means and secured to the first end of said rod means, said reflector means being adjustable towards or selectively away from said transducer means upon reciprocation of said rod means, thereby to provide a path of adjustable length between said reflector means and said transducer means,
   (e) guide means mounted to said chamber means adjacent the second end thereof,
   (f) ramp means slidably extending through said guide means and reciprocable in a direction perpendicular to the direction of movement of said rod means, said ramp means having a surface inclined at an angle other than perpendicular to the direction of movement of said rod means, said surface slidably engaging the second end of said rod means,
   (g) adjustment means mounted to said comparator to reciprocate said ramp means in said guide means, thereby to adjust the length of the path between said reflector means and said transducer means,
   (h) said ramp means having a distance calibrated scale.

2. Comparator apparatus as in claim 1, further comprising:
   (i) a body of liquid in said chamber means in contact with said transducer means and said reflector means.

3. Comparator apparatus as in claim 2, further comprising:
   (j) spring means operatively interposed between the second end of said rod means and said chamber means and biasing the second end of said rod means towards said surface of said ramp means.

4. Comparator apparatus as in claim 2, further comprising:
   (j) diaphragm means in said chamber means interposed between said reflector means and said transducer means, said diaphragm means having a reflective surface opposed to said transducer means to provide a path of fixed length between said reflective surface and said transducer means, said diaphragm having a central orifice opening the path between said reflector means and said transducer means.

5. A comparator for use with ultrasonic pulse-echo distance measuring apparatus, said comparator comprising:

(a) chamber means having first and second opposed ends, (b) transducer means extending into the first end of said chamber means, (c) rod means having first and second ends, said rod means slidably extending for reciprocating movement through the second end of said chamber means, (d) reflector means in said chamber means opposed to said transducer means and secured to the first end of said rod means, said reflector means being adjustable towards or selectively away from said transducer means upon reciprocation of said rod means, thereby to provide a path of adjustable length between said reflector means and said transducer means, (e) guide means mounted to said chamber means adjacent the second end thereof, (f) bar means slidably extending through said guide means and reciprocable in a direction perpendicular to the direction of movement of said rod means, (g) calibration lever means pivotally mounted to said bar means for rotation in a plane parallel to the direction of movement of said rod means, said calibration lever means having a surface slidably engaging the second end of said rod means, (h) calibration screw means operatively interposed between said calibration lever means and said bar means and adapted to adjust the slope of said calibration lever means in a range of angles wherein said surface of said calibration lever means is inclined at an angle other than perpendicular to the direction of movement of said rod means, (i) adjustment means mounted to said comparator to reciprocate said bar means in said guide means, thereby to reciprocate said calibration lever means and thereby to adjust the length of the path between said reflector means and said transducer means, (j) said bar means having a distance-calibrated scale.

6. Comparator apparatus as in claim 5, further comprising:

(k) a body of liquid in said chamber means in contact with said transducer means and said reflector means.

7. Comparator apparatus as in claim 6, further comprising:

(l) spring means operatively interposed between the second end of said rod means and said chamber means and biasing the second end of said rod means towards said surface of said lever means.

8. Comparator apparatus as in claim 6, further comprising:

(l) diaphragm means in said chamber means interposed between said reflector means and said transducer means, said diaphragm means having a reflective surface opposed to said transducer means to provide a path of fixed length between said reflective surface and said transducer means, said diaphragm having a central orifice opening the path between said reflector means and said transducer means.

9. A comparator for use with ultrasonic pulse-echo distance measuring apparatus, said comparator comprising:

(a) an elongated hollow cylinder, (b) partition means intermediate the ends of said cylinder dividing said cylinder into a first and second chamber at opposite ends of said cylinder, (c) a transducer extending into that end of said first chamber opposite said partition means, (d) a reflector piston in said first chamber opposed to said transducer, (e) a reciprocable piston rod having first and second ends, the first end of said piston rod being secured to said reflector piston, said piston rod slidably extending through said partition means and into said second chamber, (f) said reflector piston being adjustable towards or selectively away from said transducer upon reciprocation of said piston rod, thereby to provide a path of adjustable length between said reflector piston and said transducer, sides thereof forming a guideway, (h) a calibration ramp housing slidably extending through said openings and through said second chamber and reciprocable in a direction perpendicular to the direction of movement of said piston rod, (i) a calibration ramp pivotally mounted to said calibration ramp housing for rotation in a plane parallel to the direction of movement of said piston rod, said calibration ramp having a surface slidably engaging the second end of said piston rod, (j) a calibration screw threaded through one end of said calibration ramp and adapted to engage said calibration ramp housing, said calibration screw being adapted further to adjust the slope of said calibration ramp relative to said calibration ramp housing, (k) measuring screw means threadedly mounted in said elongated cylinder transversely thereof and engaging said calibration ramp housing and adapted to reciprocate said calibration ramp housing and said calibration ramp transversely of said elongated cylinder, thereby to adjust the length of the path between said reflector piston and said transducer, (l) said calibration ramp housing having a distance-calibrated scale.

10. Comparator apparatus as in claim 9, further comprising:

(m) a body of liquid in said first chamber in contact with said transducer and said reflector piston.

11. Comparator apparatus as in claim 10, further comprising:

(n) a spring-retaining washer mounted to said piston rod within said second chamber, (o) a spring mounted concentrically to said piston rod within said second chamber and interposed between said spring-retaining washer and said partition means, said spring biasing said piston rod toward said surface of said calibration ramp.

12. Comparator apparatus as in claim 10, further comprising:

(n) a diaphragm in said first chamber interposed between said reflector piston and said transducer, said diaphragm having a reflective surface opposed to said transducer to provide a path of fixed length between said reflective surface and said transducer, said diaphragm having a central orifice opening the path between said reflector piston and said transducer.

13. A comparator for use with ultrasonic pulse-echo distance measuring apparatus, said comparator comprising:

(a) an elongated hollow cylinder, (b) partition means intermediate the ends of said cylinder dividing said cylinder into a first and second chamber at opposite ends of said cylinder, (c) said first chamber having a threaded opening at that end thereof opposite said partition means, (d) a tubular member adapted to be threaded into said threaded opening or selectively removed therefrom, said tubular member having:
 a centrally-orificed reflector diaphragm,
 a second threaded opening, (e) a transducer adapted to be threaded into said second threaded opening of said tubular member spaced from said centrally-orificed reflector diaphragm and on that side of said centrally-orificed diaphragm opposite said partition means or selectively to be threaded into the threaded opening of said first chamber, (f) said reflector diaphragm being adapted to provide a path of fixed length between said reflector diaphragm and said transducer when said tubular member is threaded into the threaded opening in said first chamber, (g) a reflector piston in said first chamber opposed to said transducer, (h) a reciprocable piston rod having first and second ends, the first end of said piston rod being secured to said reflector piston, said piston rod slidably extending through said partition means and into said second chamber, (i) said reflector piston being adjustable towards or selectively away from said transducer upon reciprocation of said piston rod, thereby to provide a path of adjustable length between said reflector piston and said transducer, the orifice in said reflector diaphragm opening said last-mentioned path between said reflector diaphragm and said transducer when said tubular member is threaded into the threaded opening in said first chamber, (j) said second chamber having openings on opposite sides thereof forming a guideway, (k) a calibration ramp housing slidably extending through said openings and through said second chamber and reciprocable in a direction perpendicular to the direction of movement of said piston rod, (l) a calibration ramp pivotally mounted to said calibration ramp housing for rotation in a plane parallel to the direction of movement of said piston rod, said calibration ramp having a surface slidably engaging the second end of said piston rod, (m) a calibration screw threaded through one end of said calibration ramp and adapted to engage said calibration ramp housing, said calibration screw being adapted further to adjust the slope of said calibration ramp relative to said calibration ramp housing, (n) measuring screw means threadedly mounted in said elongated cylinder transversely thereof and engaging said calibration ramp housing and adapted to reciprocate said calibration ramp housing and said said calibration ramp transversely of said elongated cylinder, thereby to adjust the length of the path between said reflector piston and said transducer, (o) said calibration ramp housing having a distance-calibrated scale.

14. Comparator apparatus as in claim 13, further comprising:

(p) a body of liquid in said first chamber in contact with said reflector piston and said transducer.

15. Comparator apparatus as in claim 14, further comprising:

(q) a spring retaining washer mounted to said piston rod within said second chamber, (r) a spring mounted concentrically to said piston rod within said second chamber and interposed between said spring retaining washer and said partition means, said spring biasing said piston rod toward said surface of said calibration ramp.

References Cited
UNITED STATES PATENTS

| | | | |
|---|---|---|---|
| 2,407,294 | 9/1946 | Shockley et al. | |
| 2,427,348 | 9/1947 | Bond et al. | 340—10 |
| 2,446,835 | 8/1948 | Keary | 333—30 |

JAMES J. GILL, *Primary Examiner.*

JOHN P. BEAUCHAMP, *Examiner.*

UNITED STATES PATENT OFFICE
CERTIFICATE OF CORRECTION

Patent No. 3,349,608                                        October 31, 1967

Dexter A. Olsson et al.

It is hereby certified that error appears in the above numbered patent requiring correction and that the said Letters Patent should read as corrected below.

Column 8, line 8, before "sides" insert the following:

(g)    said second chamber having
               openings on opposite

Signed and sealed this 19th day of November 1968.

(SEAL)
Attest:

Edward M. Fletcher, Jr.                            EDWARD J. BRENNER
Attesting Officer                                      Commissioner of Patents